United States Patent [19]
Fujimoto

[11] Patent Number: 5,966,468
[45] Date of Patent: *Oct. 12, 1999

[54] IMAGE PROCESSING APPARATUS AND METHOD THEREFOR

[75] Inventor: Ryo Fujimoto, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/510,693

[22] Filed: Aug. 3, 1995

[30] Foreign Application Priority Data

Aug. 4, 1994 [JP] Japan ..................................... 6-183371

[51] Int. Cl.⁶ .............................. G06K 9/36; G06K 9/34; H04N 1/387; H04N 1/40
[52] U.S. Cl. .......................... 382/239; 382/176; 358/462; 358/453; 358/468; 705/400
[58] Field of Search ..................................... 395/118, 100, 395/133, 650; 358/462, 453, 468, 467, 442, 448; 382/311, 310, 309, 176, 239; 345/902; 705/400

[56] References Cited

U.S. PATENT DOCUMENTS

| | | |
|---|---|---|
| 4,868,758 | 9/1989 | Kokubu .................................... 705/400 |
| 4,885,765 | 12/1989 | Shirakawa .................................. 379/93 |
| 4,953,013 | 8/1990 | Tsuji et al. ............................... 358/530 |
| 5,086,346 | 2/1992 | Fujisawa .................................. 358/453 |
| 5,220,417 | 6/1993 | Sugiura .................................... 358/515 |
| 5,345,317 | 9/1994 | Katsuno et al. ........................ 358/429 |
| 5,361,147 | 11/1994 | Katayama et al. ...................... 358/532 |
| 5,416,606 | 5/1995 | Katayama et al. ...................... 358/467 |
| 5,444,550 | 8/1995 | Enokida et al. ......................... 358/453 |
| 5,687,313 | 11/1997 | Hirosawa et al. .................. 395/200.54 |

Primary Examiner—Thomas D. Lee
Assistant Examiner—Wenpeng Chen
Attorney, Agent, or Firm—Fitzpatrick, Cella, Harper & Scinto

[57] ABSTRACT

In an image processing system, a color or monochrome image region in an image is discriminated, and communication charges are displayed, as required when regions of the image are encoded by appropriate encoding methods in units of the regions, and are transmitted to a designated destination. An operator switches an encoding method with reference to the displayed information, thereby determining appropriate encoding methods in units of displayed regions. Therefore, a transmission that sufficiently reflects the operator's intention is achieved.

39 Claims, 10 Drawing Sheets

F I G. 9

| | | DATA FORMAT | IMAGE POCESSING | ENCODING METHOD | |
|---|---|---|---|---|---|
| HALFTONE IMAGE | COLOR | MULTI-VALUE COLOR | — | JPEG (COLOR) | ① |
| | MONOCHROME | MULTI-VALUE MONOCHROME | — | JPEG (MONOCHROME) | ② |
| | COLOR | BINARY RGB | PSEUDO HALFTONE PROCESSING | JBIG (COLOR) | ③ |
| | MONOCHROME | BINARY MONOCHROME | PSEUDO HALFTONE PROCESSING | JBIG (MONOCHROME) | ④ |
| CHARACTER IMAGE | COLOR | MULTI-VALUE COLOR | EDGE EMPHASIS | JPEG (COLOR) | ⑤ |
| | MONOCHROME | MULTI-VALUE MONOCHROME | EDGE EMPHASIS | JPEG (MONOCHROME) | ⑥ |
| | COLOR | BINARY RGB | BINARIZATION USING SINGLE THRESHOLD VALUE | JBIG (COLOR) | ⑦ |
| | MONOCHROME | BINARY MONOCHROME | BINARIZATION USING SINGLE THRESHOLD VALUE | JBIG (MONOCHROME) | ⑧ |

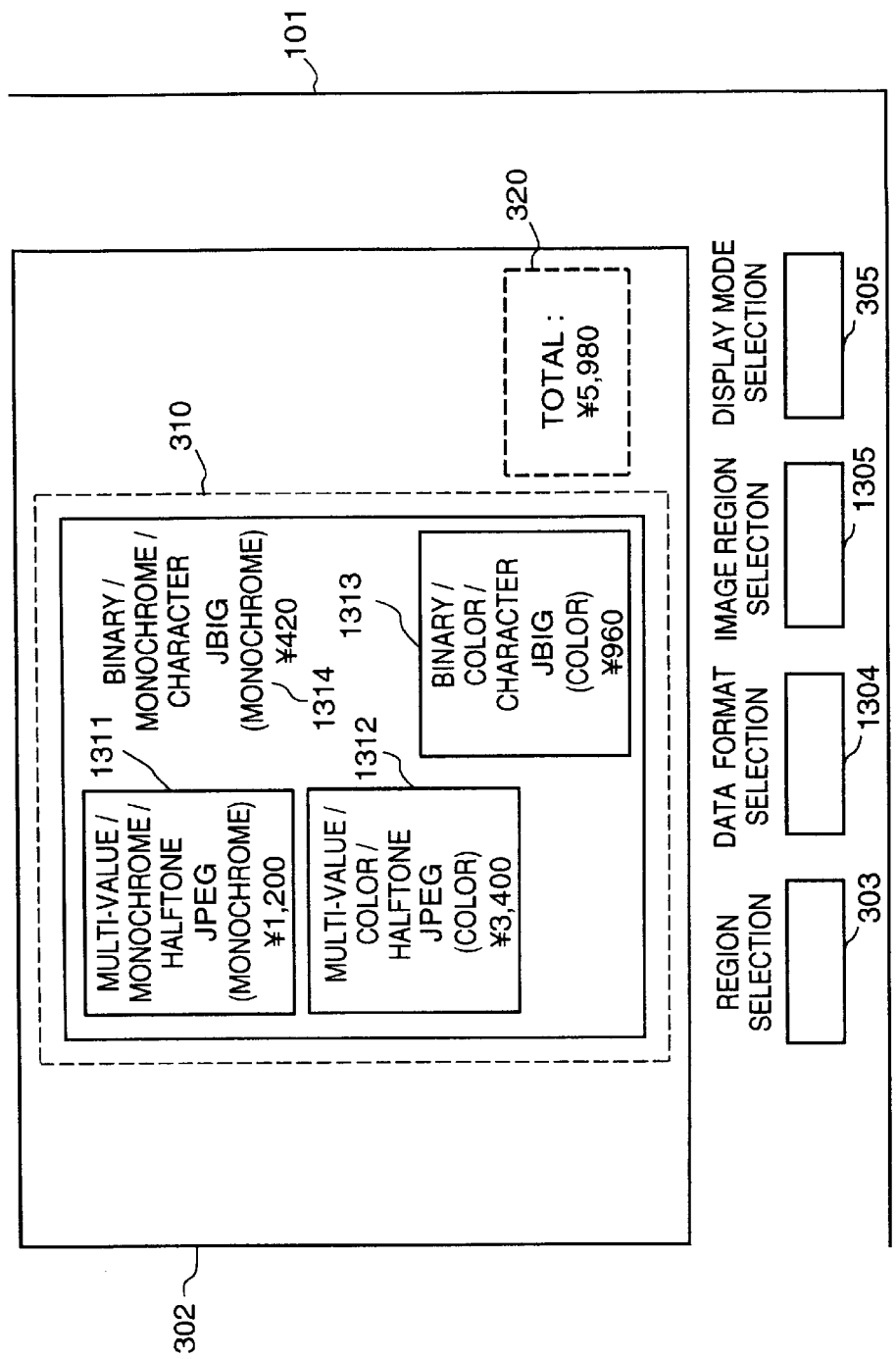

IMAGE PROCESSING APPARATUS AND METHOD THEREFOR

BACKGROUND OF THE INVENTION

This invention relates to an image processing apparatus and a method therefor and, more particularly, to an image processing apparatus and method therefor which processes an image including image regions which have to be respectively coded corresponding to different proper encoding methods.

Conventionally, in a facsimile apparatus which transmits a color image, a technique has been examined for improving the transmission efficiency and image quality by selecting an appropriate encoding method upon transmission depending on whether the image to be transmitted is a color or monochrome image. As a method of determining whether the image is a color or monochrome image, a method of manually selecting a color or monochrome image by an operator, and a method of automatically discriminating a color or monochrome image in the apparatus have been examined. In order to automatically discriminate an image in the apparatus, whether the image is a color or monochrome image is discriminated on the basis of, e.g., the ratio of R, G, and B outputs from reading sensors.

However, recently, documents have been used which include a complicated combination of a color image and monochrome binary characters in one page. Since the above-mentioned conventional facsimile apparatus discriminates whether the entire image for one page is a color or monochrome image, it is difficult to obtain an appropriate discrimination result when the image for one page includes a complicated combination of a color image and monochrome binary characters. For example, if the image includes even a small color portion, the apparatus discriminates the entire image to be a color image, and compresses the entire image by a compression encoding method such as JPEG suitable for a color image (especially, a natural image) upon transmission of the image. As a result, the following problems are posed:

The total transmission amount increases, resulting in high transmission cost.

Since the compression encoding method suitable for a color image (especially, a natural image) is used, the quality of monochrome characters deteriorates.

SUMMARY OF THE INVENTION

It is an object of the present invention to provide an image processing apparatus and method, which attains transmission that sufficiently reflects an operator's intention, in such a manner that an image is divided into a plurality of image regions in the apparatus, and an operator determines encoding methods in units of regions.

According to the present invention, the foregoing object is attained by providing an image processing apparatus including input means for inputting an image, dividing means for dividing the image into a plurality of image regions, display means for displaying region information including information indicating encoding methods in units of image regions divided by the dividing means, changing means for changing the region information, encoding means for performing encoding in units of image regions in accordance with the region information changed by the changing means, and output means for outputting image data encoded by the encoding means.

In accordance with the present invention as described above, since the communication data amount, which is obtained when an image is divided into a plurality of image regions and the divided regions are encoded by appropriate encoding methods in units of regions, is displayed, an operator can confirm and change the encoding methods. Therefore, an operator can set appropriate encoding methods in units of image regions to attain a required communication amount, and can transmit an image which is encoded by these encoding methods.

It is another object of the present invention to provide an image processing apparatus and method, which attains transmission that sufficiently reflects an operator's intention, in such a manner that an image is divided into a plurality of image regions in the apparatus, and an operator confirms and changes image features in units of regions to set encoding methods corresponding to the image features.

According to the present invention, the foregoing object is attained by providing an image processing apparatus including input means for inputting an image, dividing means for dividing the image into a plurality of image regions in accordance with image features, setting means for setting encoding methods in units of image regions divided by the dividing means, display means for displaying region information including information indicating the encoding methods set by the setting means in units of image regions, changing means for changing the region information, encoding means for performing encoding in units of image regions in accordance with the region information changed by the changing means, and output means for outputting image data encoded by the encoding means.

In accordance with the present invention as described above, since the communication data amount, which is obtained when an image is divided into a plurality of image regions, appropriate encoding methods are set in units of regions in correspondence with image features, and the divided regions are encoded by the set encoding methods, is displayed together with the image features, an operator can confirm and change the image features. Therefore, an operator can set appropriate encoding methods in correspondence with required image features, and can transmit an image encoded by the set encoding methods.

The invention is particularly advantageous since the communication cost can be minimized reflecting the operator's intention. That is, after an image for one page is divided into regions in correspondence with the features of images, and appropriate encoding methods are set in units of regions, at least one of communication cost and transmission time is displayed, and an operator can change the encoding methods of the regions after he or she confirms the display.

In place of the encoding methods themselves, image features in units of regions can be set by an operator, and encoding methods can be set in correspondence with the image features, thus allowing more flexible setting operations of the encoding methods.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view showing an example of a table for setting encoding methods in units of image regions in the second embodiment; and FIG. 10 is a view showing a display example (communication charge mode) on the display panel 104 in the second embodiment.

DESCRIPTION OF THE PREFERRED EMBODIMENTS

Preferred embodiments of the present invention are described in detail below in accordance with the accompanying drawings.

<First Embodiment>

Figure 1:
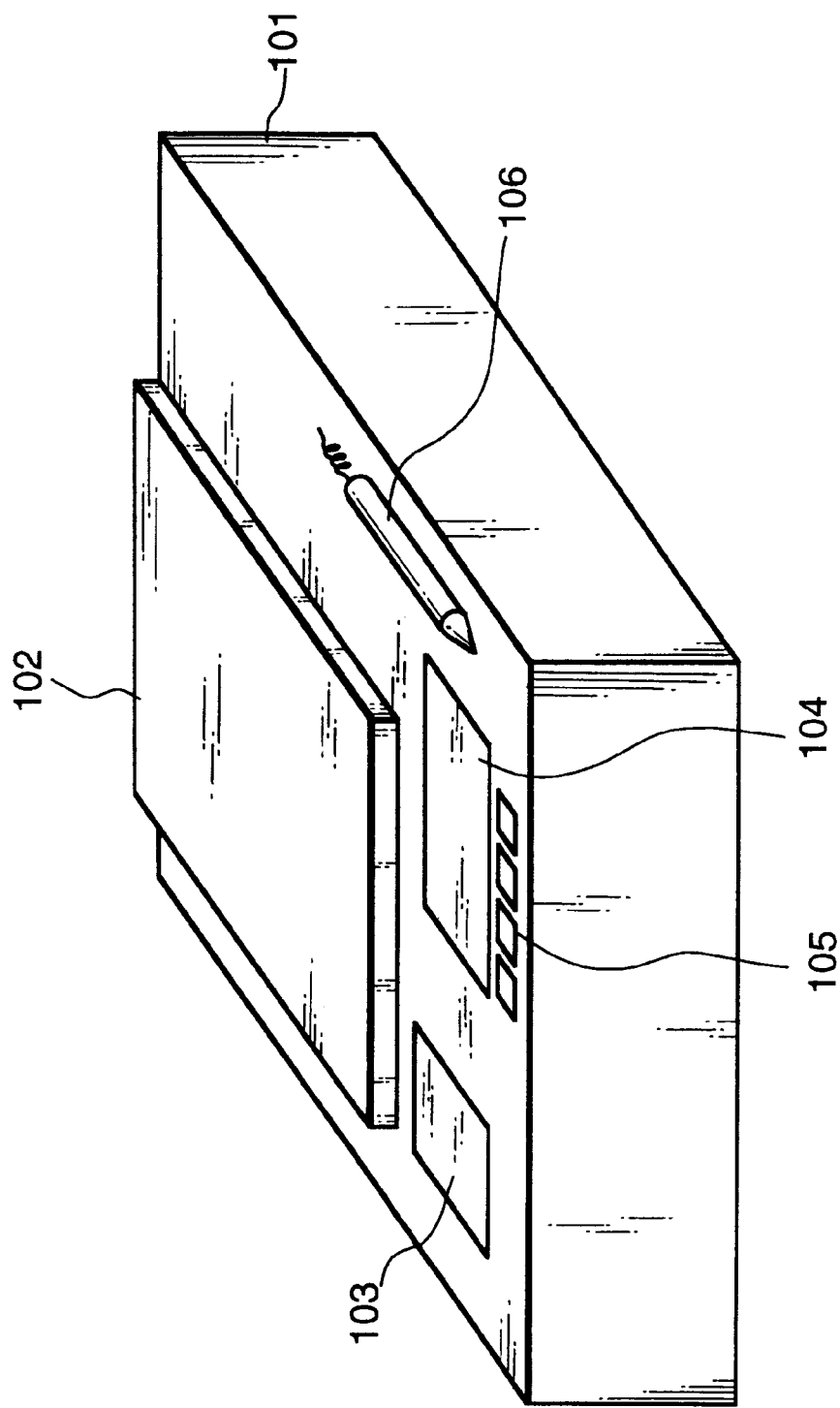
FIG. 1 is a perspective view showing the outer appearance of a facsimile apparatus according to the first embodiment of the present invention.

FIG. 1 is a perspective view showing the outer appearance of a color facsimile apparatus according to this embodiment. Referring to FIG. 1, reference numeral 101 denotes a facsimile apparatus main body; and 102, a cover of an image input unit such as a scanner. When an operator opens the cover 102, places an original on an image input unit (not shown), closes the cover 102, and instructs start of transmission from an operation panel 103, an original scanning operation is started. Reference numeral 103 denotes the operation panel which is used for inputting a telephone number as a transmission destination, selecting an abbreviated dial, and the like. Reference numeral 105 denotes a key input unit which is used by an operator to switch original regions, encoding methods, display modes, and the like according to this embodiment. Reference numeral 104 denotes a display panel, which comprises, e.g., an LCD, and informs instruction contents input by the operation panel 103 and the key input unit 105, the operation state of the apparatus, and the like to a user. Reference numeral 106 denotes a pen input device.

Figure 3:
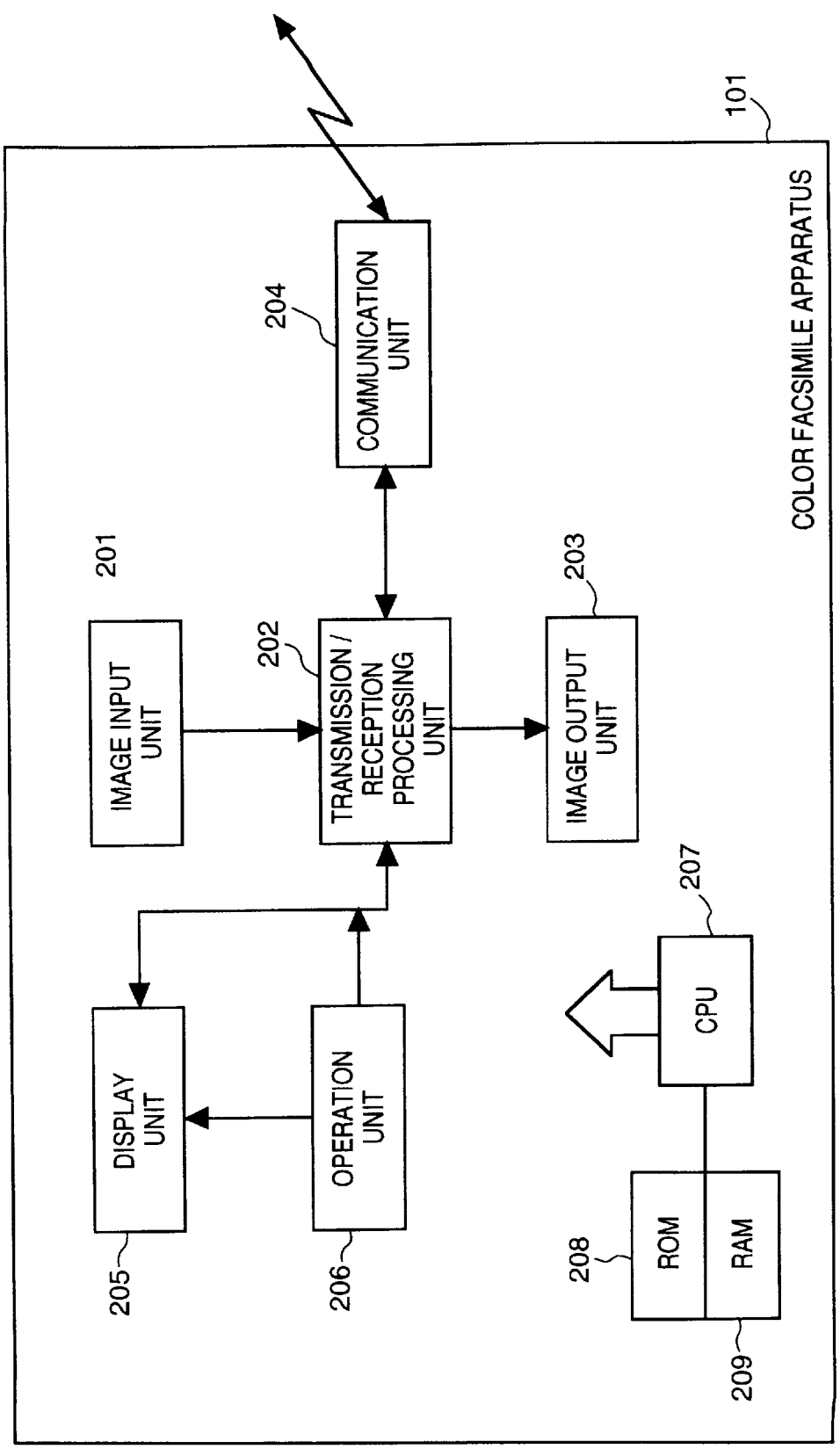
FIG. 3 is a block diagram showing the arrangement of the facsimile apparatus of the first embodiment.

FIG. 3 is a block diagram showing the arrangement of the above-mentioned color facsimile apparatus 101. Referring to FIG. 3, reference numeral 201 denotes an image input unit, such as a color scanner including a CCD sensor, for inputting an image; 202, a transmission/reception processing unit for performing various kinds of image processing including encoding processing and decoding processing of an image for transmission and reception; 203, an image output unit for outputting a received image; 204, a communication unit for transmitting/receiving an image; 205, a display unit including the above-mentioned display panel; and 206, an operation unit including the above-mentioned operation panel 103 and key input unit 105. These units are systematically controlled by a CPU 207. The CPU 207 comprises a ROM 208 for storing control programs for the CPU, and a RAM 209 serving as a work area of the CPU. Note that the transmission/reception processing unit 202 can execute encoding and decoding methods of a plurality of types of algorithms, as described later.

Figure 2:
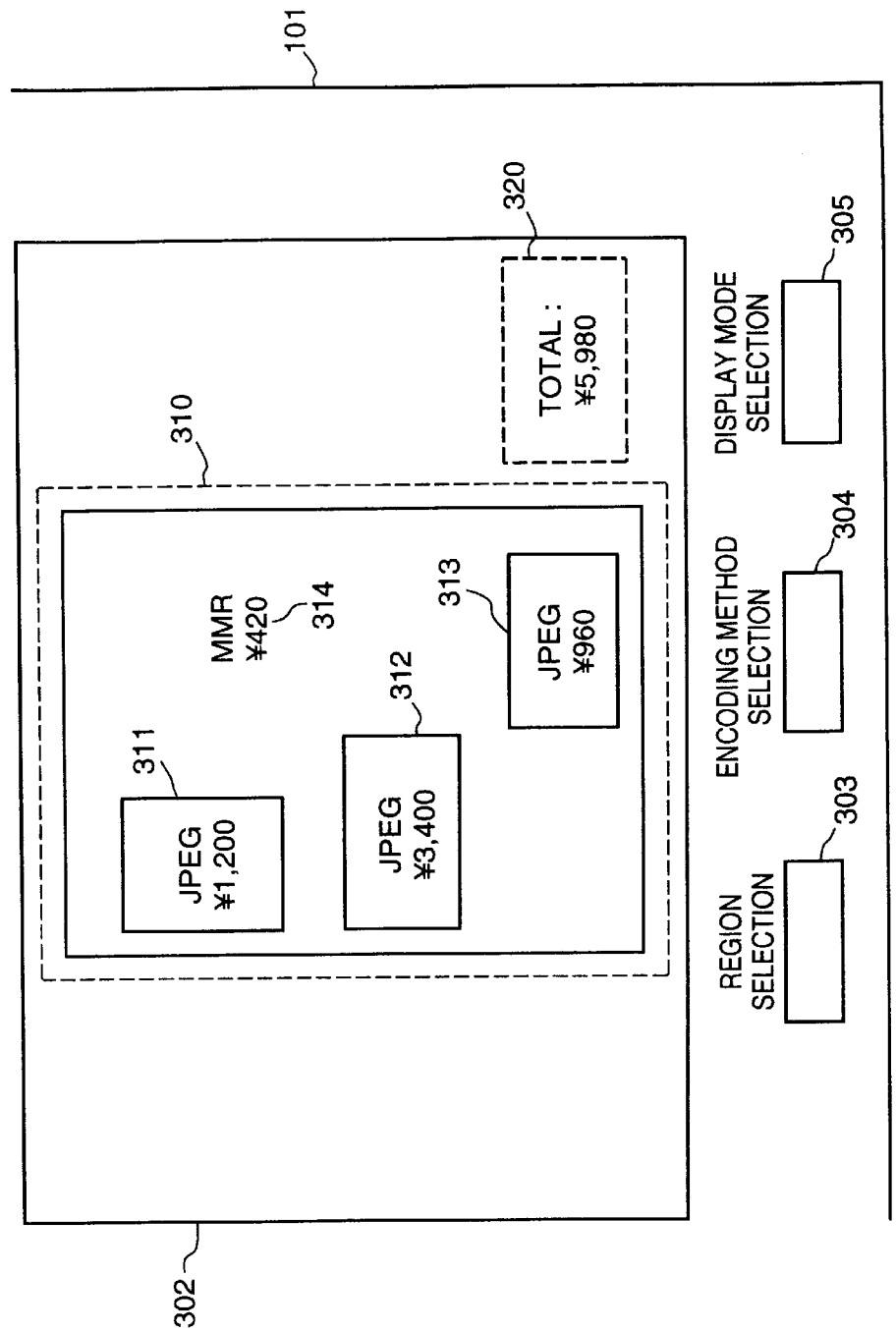
FIG. 2 is a view showing a display example (communication charge mode) on a display panel 104 in the first embodiment.

FIG. 2 is an enlarged view of a portion near the display panel 104 and the key input unit 105 shown in FIG. 1. Reference numeral 301 denotes a window for displaying the telephone number of a destination station and the like designated by the operation panel 103. Reference numeral 302 denotes a display region for displaying regions in an original, and encoding methods, communication charges, and the like in the regions. Reference numeral 303 denotes a push switch for switching regions in an original, as described later; 304, a push switch for switching encoding methods in the transmission/reception processing unit 202; and 305, a push switch for switching display modes.

The display region 302 includes a region 310 for displaying the region division state of an original, and a region 320 for displaying a charge upon transmission of an image to a destination displayed on the window 301. The original display region 310 includes color image regions 311 to 313, and a monochrome image region 314. These regions respectively display the corresponding encoding methods and communication charges required upon transmission of an image encoded by these encoding methods to a destination displayed on the window 310.

Figure 4:
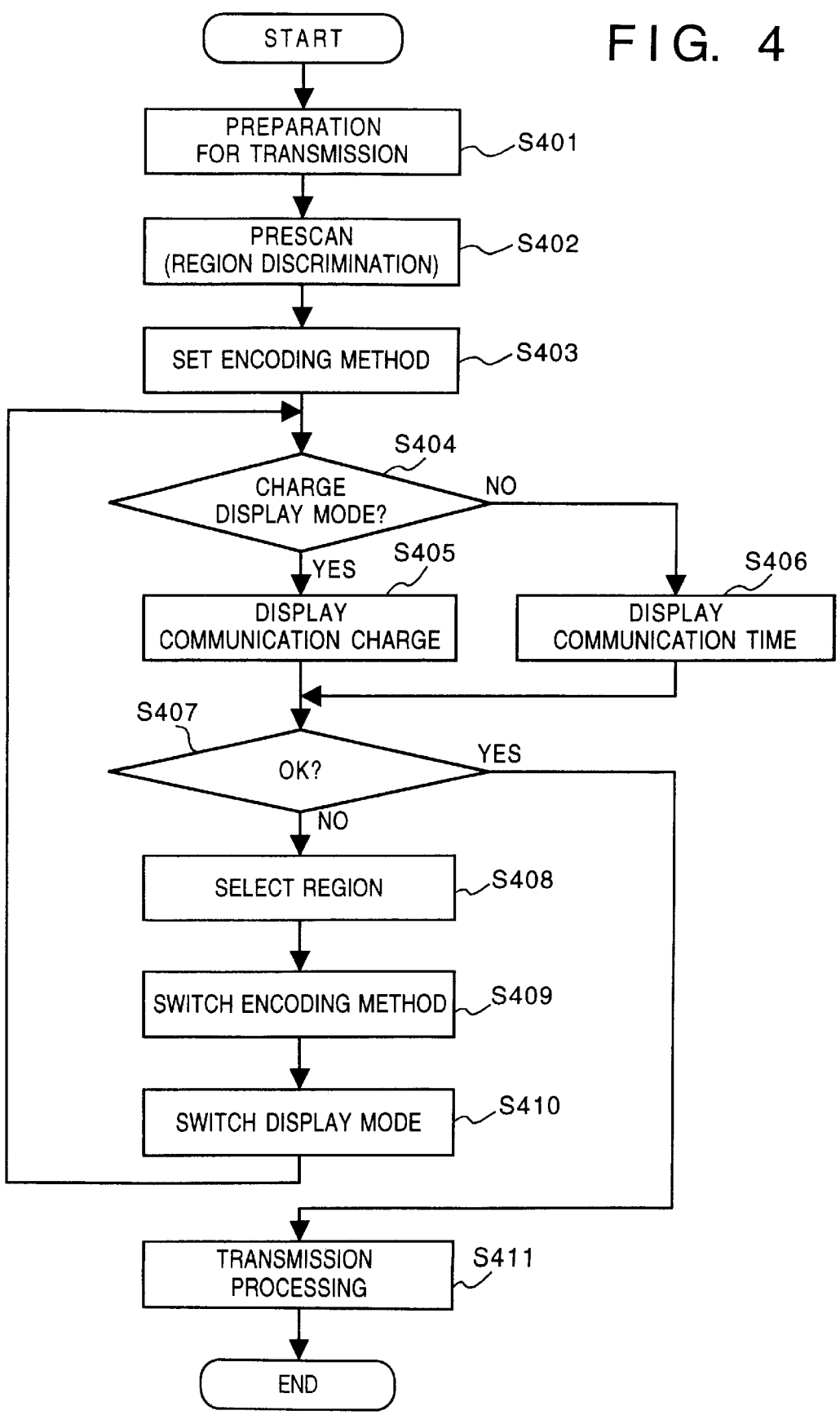
FIG. 4 is a flow chart showing the transmission processing in the first embodiment.

FIG. 4 is a flow chart showing the transmission processing of this embodiment. The transmission processing is described in detail below.

In step S401, various preparation processing operations for transmission are performed. More specifically, an operator opens the cover 102 and sets an original on the image input unit 201. Then, the operator inputs the telephone number of a transmission destination using the operation panel 103. The input telephone number of the transmission destination is displayed on the display window 301 of the display unit 205 shown in FIG. 2 in accordance with an instruction from the CPU 207. Thereafter, the operator depresses a prescan start switch provided to the operation panel 103.

The flow then advances to step S402. In step S402, the original is prescanned by, e.g., a color scanner (not shown) in the image input unit 201 in accordance with an instruction from the CPU 207, and R, G, and B multi-value image data are input. Based on the input data, color and monochrome regions are discriminated, and the image is divided into regions. A color or monochrome region is discriminated based on the ratio of R, G, and B signals in the input image data. More specifically, a portion which satisfies the relations given below is determined as a monochrome region, and a portion which does not satisfy the relations is determined as a color region:

$|R/G-1|<\alpha$ and $|B/G-1|<\beta$ where $\alpha$ and $\beta$ are appropriate and sufficiently small constants.

The flow then advances to step S403. In step S403, the JPEG encoding method (JPEG ADCT method) as a non-reciprocal encoding method for multi-value data using orthogonal transformation in units of two-dimensional blocks is set for a color region, and the MMR encoding method as a reciprocal encoding method for binary data is set for a monochrome region. Note that the JPEG compression rate is pre-stored in the RAM 209 (or ROM) as a quantization parameter, and is a fixed value depending on the apparatus, but may be changed by an operator using the operation unit 206.

In step S404, it is checked if the current display mode is the "communication charge" mode. Note that the display mode is switched by the display mode selection switch 305, and is stored in the RAM 209. In this embodiment, a default mode immediately after the power supply of the apparatus is turned on is the "communication charge" mode, but the present invention is not limited to this.

If YES in step S404, the flow advances to step S405, and predicted communication charges in units of regions are displayed on the display unit 205 in accordance with an instruction from the CPU 207. FIG. 2 above shows the display example on the display panel 104 when the display mode is the "communication charge" mode. FIG. 2 shows an example wherein an image is divided into three independent color regions and a single continuous monochrome region. The encoding methods of the regions and charges required for transmitting corresponding images are displayed in units of regions. The total charge required when the image is transmitted in this state is displayed on the display region 320. Note that this embodiment adopts the Japanese Yen (¥) charge system but may adopt other charge systems such as the US Dollar ($) charge system as long as communication costs can be clearly understood.

Figure 5:
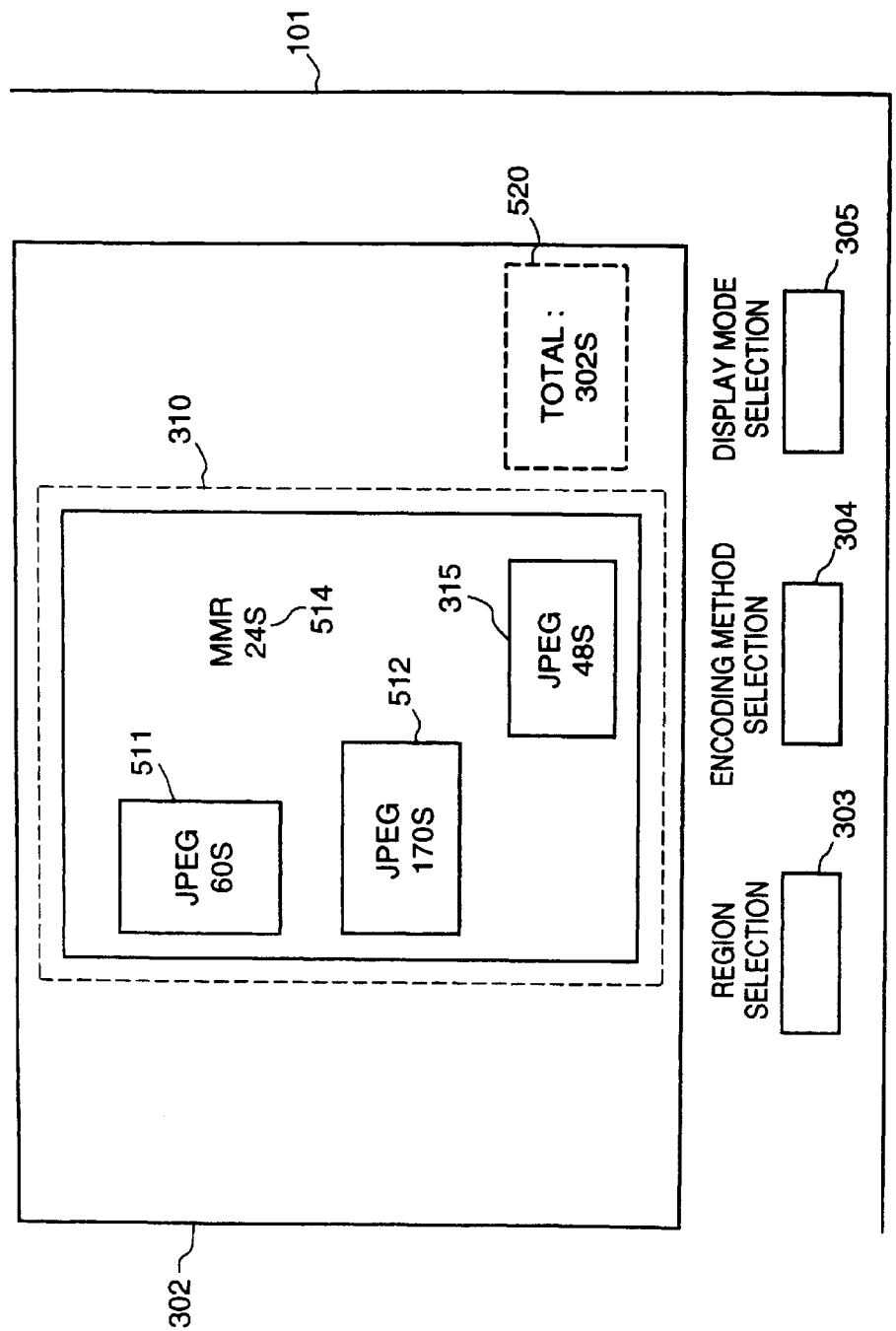
FIG. 5 is a view showing a display example (communication time mode) on the display panel 104 in the first embodiment.

On the other hand, if it is determined in step S404 that the current display mode is not the "communication charge" mode, i.e., if the current display mode is the "communication time" mode in this embodiment, the flow advances to step S406, and predicted communication times in units of divided regions are displayed on the display unit 205 in accordance with an instruction from the CPU 207. FIG. 5 shows this display example. FIG. 5 displays the communication times 315 in units of regions, while FIG. 2 displays the communication charges 313 in units of regions. Note that the communication charges 313 and communication times 315 to be displayed are determined by looking up a charge table and the like stored in the ROM 208.

Figure 7:
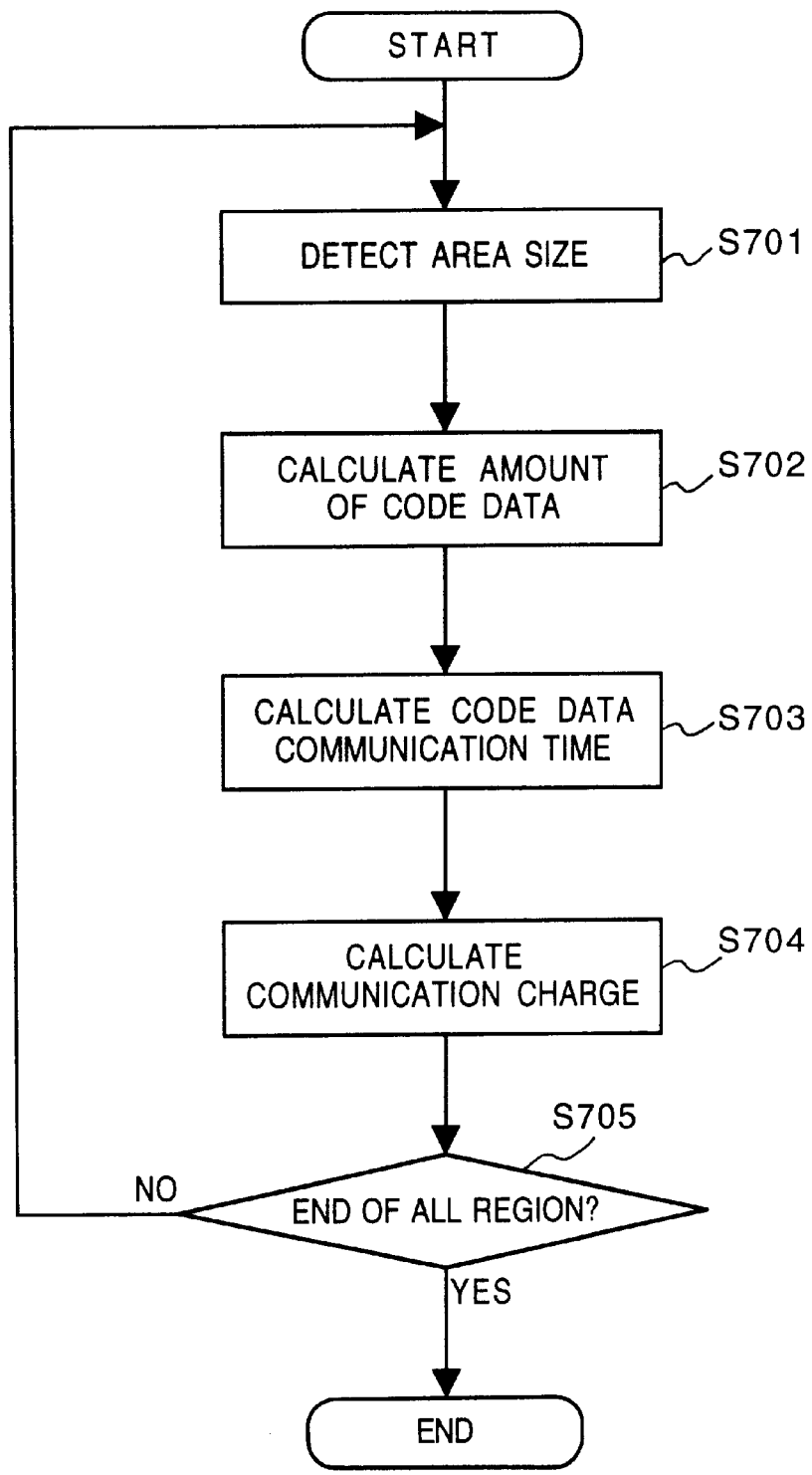
FIG. 7 is a flow chart showing the method of calculating a "communication charge" in the first embodiment.

FIG. 7 is a flow chart showing the method of calculating the "communication charge".

In step S701, the size of a region to be processed is detected. In step S702, the amount of code data obtained when the region of the detected size is encoded by the encoding method set in step S403 above is calculated. In this case, the amount of code data may be calculated by counting the code amount by executing actual encoding or by predicting the code amount in correspondence with a standard compression rate of the set encoding method.

In step S703, the time required for a communication is calculated on the basis of the amount of code data and the capacity of a communication line. In step S704, the communication charge is calculated on the basis of the communication time and the charge table. The flow advances to step S705 to repeat the above-mentioned calculation of the communication charge in units of regions.

Referring back to FIG. 4, the flow advances to step S407. In step S407, an operator confirms the communication charge or communication time displayed on the display region 302, decides if he or she actually wants to perform the transmission requiring the displayed charge or time, and instructs the presence/absence of a change using the operation unit 206.

For example, in FIG. 2, the total charge is 5,980 Yen (¥). If the operator determines in step S407 that this charge is too expensive, the flow advances to step S408 to change the total charge. In processing in step S408 and subsequent steps, the total charge is changed by changing the encoding methods in units of regions.

For example, in FIG. 2, the color region 312 is encoded by the JPEG encoding method, and a communication of only this region costs 3,400 Yen (¥). A case is examined below wherein the color region 312 is not so important, and no serious problem is posed even if this region is transmitted as a binary monochrome region and a person who is to receive this image may not be able to sufficiently understand the contents of this region due to deterioration of the image quality.

In this case, the operator depresses the region selection switch 303 in step S408. Then, the display state of the color region 311 is inverted to inform the operator of the fact that the region 311 is selected. Furthermore, when the region selection switch 303 is depressed once again, the color region 312 is selected in turn. In this manner, in step S408, the operator can select the color region (311 to 313) to be changed. Assume that the color region 312 is selected. In this embodiment, only a color region is selectable. Of course, a monochrome region may also be selected.

Figure 6:
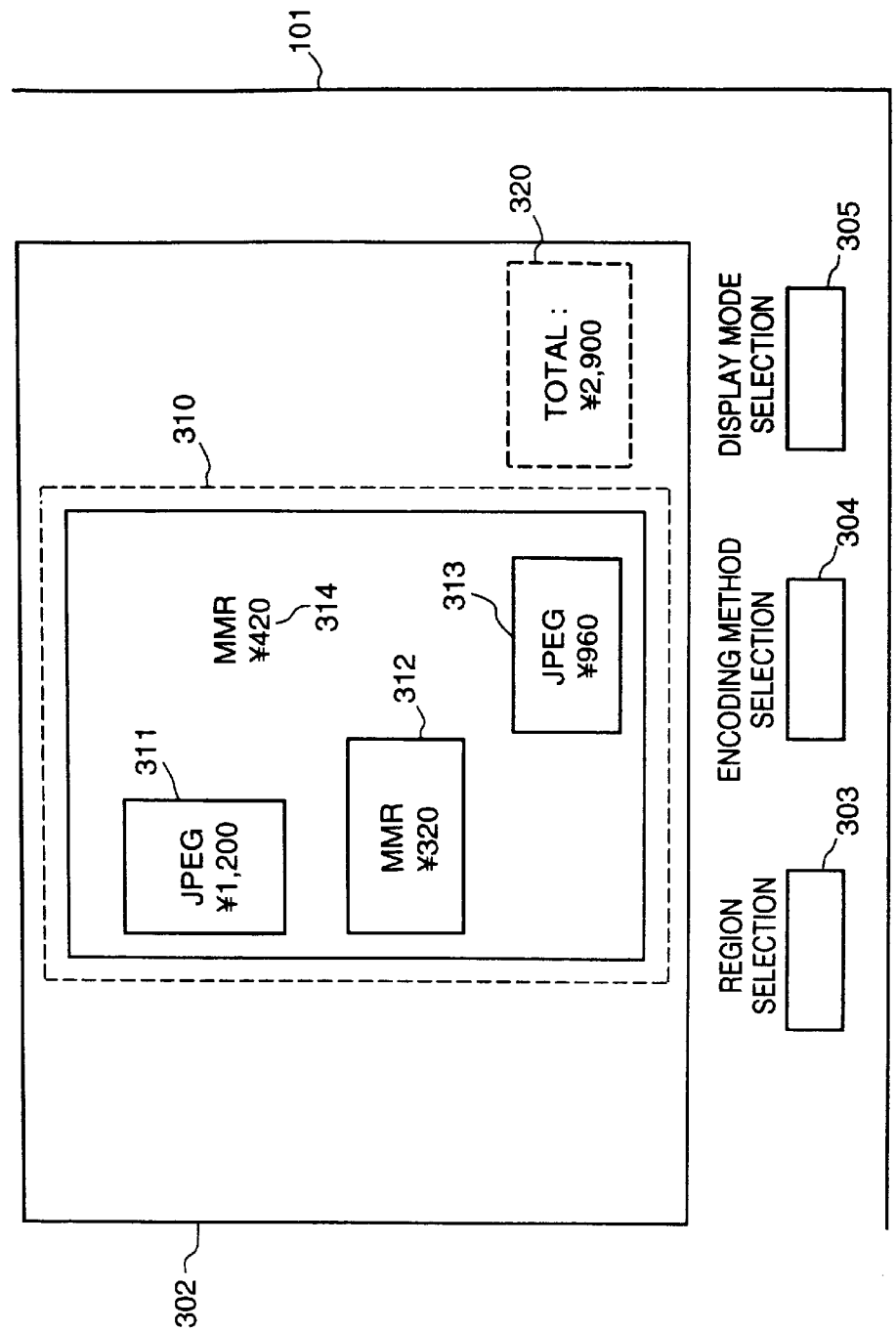
FIG. 6 is a view showing a display example (communication charge mode) on the display panel 104 in the first embodiment.

The flow then advances to step S409. In step S409, when the operator depresses the encoding method selection switch 304, the encoding method of the color region 312 selected in step S408 is switched from the JPEG method to the MMR method. FIG. 6 shows this state. As can be seen from FIG. 6, since the encoding method of the color region 312 is switched to the MMR method, the communication charge of the color region 312 changes to 320 Yen (¥) and the total charge displayed on the region 320 changes to 2,900 Yen (¥). In this state, when the encoding method selection switch 304 is depressed again, the encoding method of the color region 312 can be returned to the JPEG method. In this case, the displayed communication charge of the color region 312 and the displayed total charge also return to 3,400 Yen (¥) and 5,980 Yen (¥), respectively.

In step S410, if necessary, the operator depresses the display mode selection switch 305 to change the display mode to the "communication time" mode. The flow then returns to step S404.

If the operator decides that he or she actually wants to perform the transmission requiring the charge or time displayed on the display panel 104 in step S407, the flow advances to step S411. When the operator depresses a transmission start switch (not shown), the color scanner or the like in the image input unit 201 performs a main scan to obtain R, G, and B multi-value image data, and the transmission/reception processing unit 202 performs predetermined encoding operations in units of regions for the obtained R, G, and B multi-value image data. Thereafter, the encoded image data are transmitted from the communication unit 204.

Note that an end key or the like other than the transmission start switch may be provided to confirm the end of various setting operations in step S407. Alternatively, the end of the setting operations may be determined in a state wherein the region selection switch 303 is continuously depressed to indicate that none of regions are selected.

As has been described above, according to the present invention, the encoding method for a selected color region can be arbitrarily changed by an operator, and the communication cost can be reduced reflecting the operator's intention.

Note that designation of a color region, selection of an encoding method, and the like on the display region 302 of this embodiment may be attained using the pen input device 106.

In the first embodiment described above, the displayed contents are changed using the push switches or the pen input device. However, the present invention is not limited to this embodiment. For example, various other selection means such as a touch panel operated with an operator's finger, a dial, a joystick, and the like may be used. When the above-mentioned sequence is stored in a magnetic storage medium and is executed using a computer, the above-mentioned selections may be realized by moving a cursor, using a mouse or a predetermined key on a keyboard.

As for the region division method, an image is divided into color and monochrome regions in the first embodiment described above. However, the present invention is not limited to the method of dividing an image into two types of regions. For example, an image may be divided into binary and multi-value regions or a combination of color/monochrome regions and binary/multi-value regions. Thus, an appropriate region division method is selected in correspondence with the characteristics of the apparatus.

In the method of separating color and monochrome regions, the discrimination precision can be improved by adding various other complicated processing operations. For example, the portion satisfying a relation given below may be determined as a monochrome region:

$|(R/G)^2+(B/G)^2-2| \leq \gamma$
(A^2 means a square of A)

where $\gamma$ is a predetermined value. Alternatively, R, G, and B data may be converted into color space data of, e.g., the L*a*b* color space, the L*u*v* color space or the like, and regions may be discriminated on the basis of chromaticity data.

Furthermore, in the first embodiment, the operator can change only the encoding methods of the respective regions. However, the color and monochrome regions discriminated in the apparatus, for example, may be arbitrarily changed by the operator. In this case, appropriate encoding methods may be automatically selected in association with these changes in color/monochrome regions.

In the first embodiment described above, when an image is displayed on the original region 310 on the display unit 302 as a background image, the operator can select a desired region and can switch the encoding method as needed while observing the original contents, thus improving operability.

When the image is displayed as a background image, the display colors of boundary lines indicating the regions, and "communication charges" or "communication times" are set to be those which are easy to see in accordance with the color tone of the image. In this case, the CPU 207 automatically sets these display colors by detecting complementary colors of the color tone of the image.

The display contents and display methods on the display panel 104 are not limited to those in the first embodiment. For example, only an operator who has a thorough knowledge of the compression technique understands "JPEG", "MMR", and the like. Thus, these terms may be replaced by those which are easy to understand by general operators. The display panel is preferably arranged on the upper portion of the cover 102 of the scanner unit in terms of operability.

In addition, each of a set of an encoding method, communication cost, and communication time may be simultaneously displayed, or a variable representing a communication amount may be displayed. When an operator forgets to set a transmission destination or when there are a plurality of transmission destinations as in the multi-address communication mode, it is effective to display only a variable representing a pertinent communication amount.

When the divided region is small, it becomes difficult to display the contents in the region. In this case, a function of displaying the designated region in an enlarged scale may be added.

In the first embodiment, the color region is encoded by the JPEG method. However, the present invention is not limited to this as long as an encoding method such as vector quantization suitable for encoding a color image or a multi-value image is used. Also, the encoding method for the monochrome region is not limited to the MMR encoding method, and the MH encoding method may be used. Furthermore, a plurality of encoding methods may be set for one type of image to allow selection of a desired method.

<Second Embodiment>

The second embodiment according to the present invention is described below. Note that the arrangement of an image processing apparatus of the second embodiment is the same as that of the first embodiment described above, and a detailed description thereof is omitted.

Figure 8:
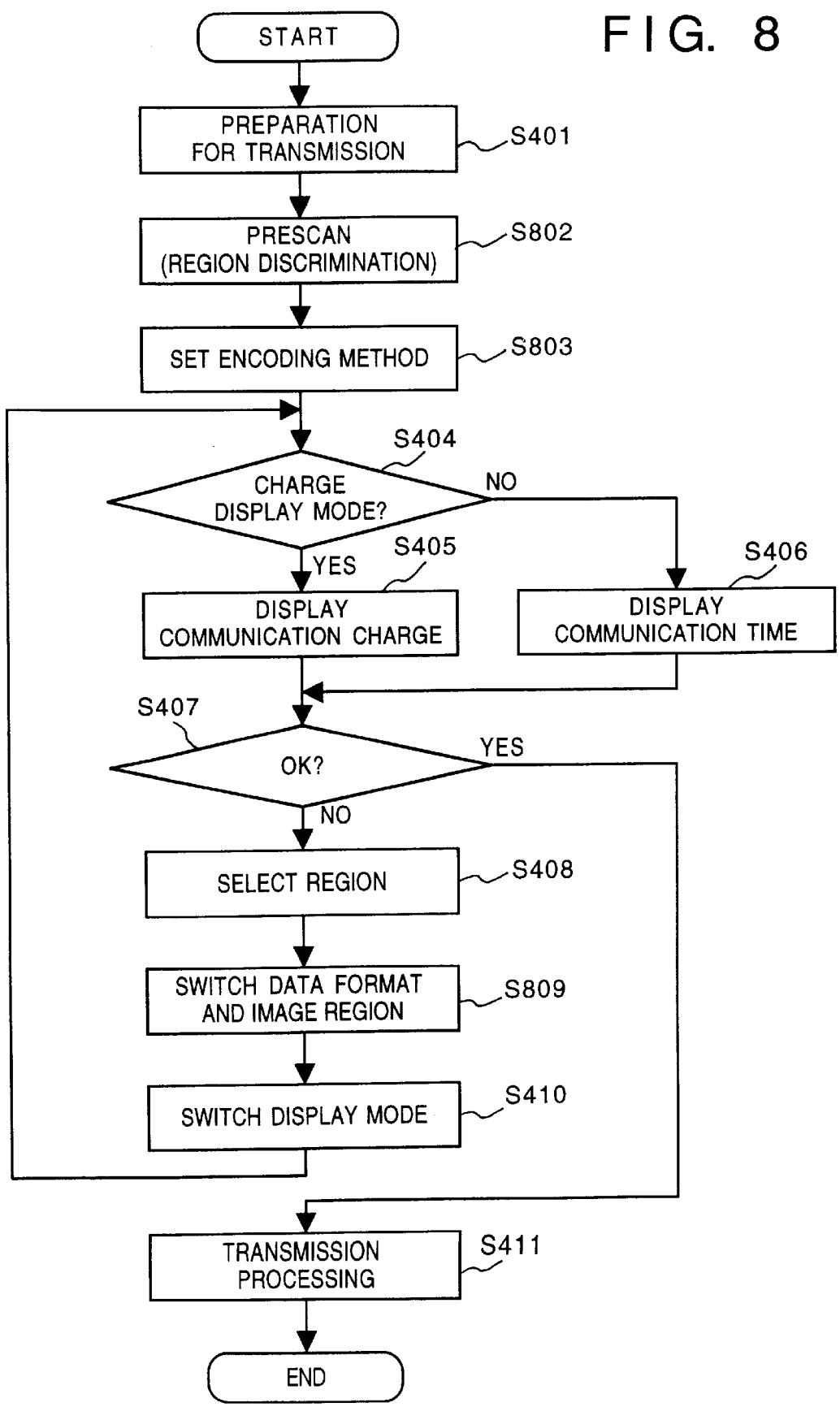
FIG. 8 is a flow chart showing the transmission processing according to the second embodiment of the present invention.

FIG. 8 is a flow chart showing the transmission processing of the second embodiment. The transmission processing is described in detail below. The processing of the second embodiment is substantially the same as that of the first embodiment shown in the flow chart of FIG. 4, except for step S802 which performs region discrimination by means of a prescan operation, step S803 which determines the encoding method, and step S809 which switches the data format and image region. The same step numbers in FIG. 8 denote the same steps as in FIG. 4, and a detailed description thereof is omitted.

In the second embodiment, in step S802, in addition to monochrome/color discrimination of an image, data format discrimination for discriminating a multi-value image region (multi-value region) or a binary image region (limited color region), and image region discrimination for discriminating a character region or a halftone region are performed to discriminate the features of an image.

Note that a multi-value (multi-color) or binary (limited color) image region can be discriminated by counting the number of colors on the basis of the frequency distribution of image data in a corresponding region. On the other hand, a character or halftone image region can be discriminated by measuring density differences from surrounding pixels in units of pixels in a corresponding region.

In step S803, the encoding method is set in accordance with the table shown in FIG. 9.

The table shown in FIG. 9 is used for determining image processing operations and encoding methods of encoding operations to be executed by the transmission/reception processing unit 202 on the basis of the color/monochrome, image region, and multi-value/binary data format discrimination results. This table is pre-stored in the ROM 208. The contents of this table are as follows.

① Halftone Image & Multi-value Color Region
Data are encoded by the normal JPEG method without any data conversion.

② Halftone Image & Multi-value Monochrome Region
Luminance (density) components are extracted from R, G, and B data and are encoded by the JPEG method.

③ Halftone Image & Binary Color Region
Pseudo halftone processing is performed in units of R, G, and B color components by the error diffusion method or dither method, and data are encoded by the JBIG method in units of R, G, and B color components.

④ Halftone Image & Binary Monochrome Region
Luminance (density) components are extracted from R, G, and B data, are subjected to pseudo halftone processing as in ③, and are encoded by the JBIG method.

⑤ Character Image & Multi-value Color Region
Data are encoded by the normal JPEG method without any data conversion.

⑥ Character Image & Multi-value Monochrome Region

Luminance (density) components are extracted from R, G, and B data and are encoded by the JPEG method.

⑦ Character Image & Binary Color Region

Pseudo halftone processing is performed in units of R, G, and B color components by the error diffusion method or dither method, and data are encoded by the JBIG method in units of R, G, and B color components.

⑧ Character Image & Binary Monochrome Region

Luminance (density) components are extracted from R, G, and B data, are subjected to pseudo halftone processing as in ⑦, and are encoded by the JBIG method.

Note that the table shown in FIG. 9 may be stored in the RAM 209, and its contents may be appropriately changed as needed.

FIG. 10 shows a display example on the display region 302 of the encoding methods set in accordance with the table shown in FIG. 9 on the basis of the region attribute discrimination results. Note that FIG. 10 shows a display example in the communication charge mode.

Referring to FIG. 10, reference numeral 1304 denotes a data format (multi-value/binary) selection key; and 1305, an image region (character/halftone) selection key. The original display region 310 includes a multi-value/monochrome/halftone image region 1311, a multi-value/color/halftone image region 1312, a binary/color/character image region 1313, and a binary/monochrome/character image region 1314. Therefore, the regions 1311, 1312, 1313, and 1314 respectively correspond to ②, ①, ⑦, and ⑧ shown in the table in FIG. 9, and display the corresponding encoding methods and communication charges required when these regions are encoded by the corresponding encoding methods and are transmitted to a destination displayed on the window 310. Note that other keys and display regions in FIG. 10 are the same as those in FIG. 2 above, and a detailed description thereof is omitted.

Referring back to FIG. 8, an operator switches the data format or image region using the selection keys 1305 on the basis of the information displayed on the display region 302 in step S809. With this switching operation, the image processing information and the encoding methods are changed in accordance with the table shown in FIG. 9.

As described above, according to the second embodiment, the features of an image are measured with high precision, and appropriate image processing operations and encoding methods are set. Also, a flexible change operation by an operator is attained.

Note that the present invention can be applied to either a system constituted by a plurality of apparatuses such as a color image scanner, a host computer, a color printer, and the like, or an apparatus such as a color facsimile apparatus consisting of a single device. The present invention can also be applied to a case wherein the invention is achieved by supplying, to the system or apparatus, a program which realizes the above-mentioned algorithm and is stored in a storage medium such as a floppy disk.

As described above, according to the present invention, after an image for one page is divided into regions in correspondence with the features of images and appropriate encoding methods are set in units of regions, at least one of the communication cost or transmission time is displayed. Therefore, since an operator can switch the encoding methods of the respective regions after he or she confirms the displayed informations, the communication cost can be minimized by reflecting the operator's intention.

In place of the encoding methods themselves, image features in units of regions can be set by an operator, and encoding methods are set in correspondence with the image features, thus allowing more flexible setting operations of the encoding methods.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting an image;
   dividing means for dividing the image into a plurality of image regions;
   display means for displaying information representing an encoding method to be used together with communication cost obtained upon execution of encoding by the encoding method in units of image regions divided by said dividing means;
   changing means for changing the encoding method;
   encoding means for performing encoding in units of image regions in accordance with the encoding method changed by said changing means; and
   output means for outputting image data encoded by said encoding means.

2. The apparatus according to claim 1, wherein said dividing means divides the image into color and monochrome regions.

3. The apparatus according to claim 2, wherein the encoding methods in units of image regions include the JPEG encoding method for the color region and the MMR encoding method for a monochrome region.

4. The apparatus according to claim 1, wherein said dividing means divides the image into multi-value and binary image regions.

5. The apparatus according to claim 1, wherein said dividing means divides the image into halftone and character image regions.

6. The apparatus according to claim 1, wherein said display means displays a total of the communication cost for all the image regions divided by said dividing means.

7. The apparatus according to claim 1, wherein said display means displays the communication cost obtained upon execution of encoding by the encoding method changed by said changing means.

8. The apparatus according to claim 1, wherein said display means displays the image as a background image.

9. The apparatus according to claim 1, wherein said display means displays boundary lines in units of image regions.

10. An image processing apparatus comprising:
    input means for inputting an image;
    dividing means for dividing the image into a plurality of image regions in accordance with image features;
    setting means for setting encoding methods in units of image regions divided by said dividing means;
    display means for displaying information representing the encoding methods set by said setting means together with communication costs obtained upon execution of encoding by the encoding method in units of image regions;
    changing means for changing the encoding method;
    encoding means for performing encoding in units of image regions in accordance with the encoding method changed by said changing means; and
    output means for outputting image data encoded by said encoding means.

11. The apparatus according to claim 10, further comprising storage means for storing a table for setting appropriate encoding methods in units of image regions, and wherein said setting means sets the encoding methods in units of image regions in accordance with said table.

12. The apparatus according to claim 11, wherein said table includes information indicating appropriate image processing methods in units of image regions, and said encoding means performs encoding after image processing operations are performed in units of image regions in accordance with said table.

13. The apparatus according to claim 12, wherein said dividing means divides the image into color and monochrome regions.

14. The apparatus according to claim 12, wherein said dividing means divides the image into multi-value and binary image regions.

15. The apparatus according to claim 14, wherein said dividing means can switch the multi-value image region to the binary image region, or can switch the binary image region to the multi-value image region.

16. The apparatus according to claim 15, wherein said table sets, as the encoding methods in units of image regions, the JPEG encoding method for the multi-value image region and the JBIG encoding method for the binary image region.

17. The apparatus according to claim 14, wherein said dividing means further divides the image into halftone and character image regions.

18. The apparatus according to claim 17, wherein said changing means can switch the halftone image region to the character image region or can change the character image region to the halftone image region.

19. The apparatus according to claim 18, wherein said table sets pseudo halftone processing for a binary halftone image region as the image processing methods in units of image regions.

20. The apparatus according to claim 18, wherein said table sets edge emphasis processing for a multi-value character image region as the image processing methods in units of image regions.

21. The apparatus according to claim 18, wherein said table sets binarization processing for a binary character image region as the image processing methods in units of image regions.

22. The apparatus according to claim 12, wherein said display means displays a total of the communication cost of all the image regions divided by said dividing means.

23. The apparatus according to claim 12, wherein said displays the communication cost obtained upon execution of encoding by the encoding method changed by said changing means.

24. The apparatus according to claim 12, wherein said display means displays the image as a background image.

25. The apparatus according to claim 12, wherein said display means displays boundary lines in units of image regions.

26. A medium which stores a computer readable program for processing an image comprising:

means for causing input of an image;

means for causing dividing of the image into a plurality of image regions;

means for causing displaying of information representing an encoding method to be used together with communication cost obtained upon execution of encoding by the encoding in units of the image regions;

means for causing changing of the encoding means;

means for causing encoding of the image in accordance with the changed encoding method; and means for causing output of the encoded image.

27. The medium according to claim 26, wherein said image regions are divided in accordance with a characteristic of the image.

28. The medium according to claim 26, wherein said changing of the encoding method is performed by an operator.

29. An image processing method comprising:

a dividing step of dividing an input image into a plurality of image regions;

a display step of displaying information representing an encoding method to be used together with communication cost obtained upon execution of encoding by the encoding method in units of image regions divided in the dividing step;

a changing step of changing the encoding method by an operator; and an encoding step of performing encoding in units of image regions in accordance with the encoding method changed in the changing step, wherein image data encoded in the encoding step is output.

30. An image processing method comprising:

a dividing step of dividing an input image into a plurality of image regions in accordance with image features;

a setting step of setting encoding methods in units of image regions divided in the dividing step;

a display step of displaying information representing the encoding methods set in the setting step together with communication cost obtained upon execution of encoding by the encoding methods respectively in units of image regions;

a changing step of changing the encoding method by an operator; and an encoding step of performing encoding in units of image regions in accordance with the encoding method changed in the changing step, wherein image data encoded in the encoding step is output.

31. The method according to claim 30, wherein the setting step includes the step of setting the encoding methods in units of image regions in accordance with a table in which appropriate encoding methods are set in units of image regions in advance.

32. The method according to claim 31, wherein said table includes information indicating appropriate image processing methods in units of image regions, and the encoding step includes the step of performing encoding after image processing operations are performed in units of image regions in accordance with said table.

33. The apparatus according to claim 1, wherein said display means displays the plurality of image regions divided by said dividing means, and displays an encoding method to be used and communication cost upon execution of encoding by the encoding method in each display area in which each image region is displayed.

34. An image processing apparatus comprising:

input means for inputting an image;

dividing means for dividing the image into a plurality of image regions;

display means for displaying information representing an encoding method to be used together with communication time obtained upon execution of encoding by the encoding method in units of image regions divided by said dividing means;

changing means for changing the encoding method;

encoding means for performing encoding in units of image regions in accordance with the encoding method changed by said changing means; and output means for outputting image data encoded by said encoding means.

35. An image processing method comprising:

an input step of inputting an image;

a dividing step of dividing the image into a plurality of image regions;

a display step of displaying information representing an encoding method to be used together with communication time obtained upon execution of encoding by the encoding method in units of image regions divided in the dividing step;

a changing step of changing the encoding method;

an encoding step of performing encoding in units of image regions in accordance with the encoding method changed in the changing step; and an output step of outputting image data encoded in the encoding step.

36. An image processing apparatus comprising:

input means for inputting an image;

dividing means for dividing the image into a plurality of image regions;

display means for displaying information representing an encoding method to be used together with communication cost obtained upon execution of encoding by the encoding method in units of image regions divided by said dividing means;

changing means for changing the encoding method;

updating means for updating communication cost displayed by said display means in accordance with the encoding method changed by said changing means.

37. An image processing method comprising:

an input step of inputting an image;

a dividing step of dividing the image into a plurality of image regions;

a display step of displaying information representing an encoding method to be used together with communication cost obtained upon execution of encoding by the encoding method in units of image regions divided in the dividing means;

a changing step of changing the encoding method;

an updating step of updating communication cost displayed in the display step in accordance with the encoding method changed in the changing step.

38. An image processing apparatus comprising:

input means for inputting an image;

dividing means for dividing the image into a plurality of image regions;

display means for displaying information representing an encoding method to be used together with communication time obtained upon execution of encoding by the encoding method in units of image regions divided by said dividing means;

changing means for changing the encoding method;

updating means for updating communication time displayed by said display means in accordance with the encoding method changed by said changing means.

39. An image processing method comprising:

an input step of inputting an image;

a dividing step of dividing the image into a plurality of image regions;

a display step of displaying information representing an encoding method to be used together with communication time obtained upon execution of encoding by the encoding method in units of image regions divided in the dividing means;

a changing step of changing the encoding method;

an updating step of updating communication time displayed in the display step in accordance with the encoding method changed in the changing step.

* * * * *

UNITED STATES PATENT AND TRADEMARK OFFICE
CERTIFICATE OF CORRECTION

PATENT NO.   : 5,966,468
DATED        : October 12, 1999
INVENTOR(S)  : RYO FUJIMOTO It is certified that error appears in the above-identified patent and that said Letters Patent is hereby corrected as shown below:

<u>COLUMN 9</u>

Line 38, "     1305" should read --1304 and 1305--; and
Line 64, "informations," should read --information--.

Signed and Sealed this

Twenty-first Day of November, 2000

Attest:

Q. TODD DICKINSON

Attesting Officer      Director of Patents and Trademarks